(12) United States Patent
Cho

(10) Patent No.: US 8,031,356 B2
(45) Date of Patent: Oct. 4, 2011

(54) COLOR PRINTING SYSTEM

(75) Inventor: Min Ki Cho, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 752 days.

(21) Appl. No.: 12/142,044

(22) Filed: Jun. 19, 2008

(65) Prior Publication Data

US 2009/0009781 A1 Jan. 8, 2009

(30) Foreign Application Priority Data

Jul. 3, 2007 (KR) ........................ 10-2007-0066338

(51) Int. Cl.
*G06K 1/00* (2006.01)
*G06K 15/00* (2006.01)
*G06F 3/12* (2006.01)
(52) U.S. Cl. ..................... 358/1.15; 358/1.9; 358/1.16
(58) Field of Classification Search ............... 358/1.15, 358/1.16, 1.9, 500, 501, 504; 379/100.01
See application file for complete search history.

(56) References Cited

U.S. PATENT DOCUMENTS

| 7,019,861 | B2 * | 3/2006 | Aagesen ...................... 358/1.15 |
| 2002/0010806 | A1 | 1/2002 | Yamade | |
| 2003/0202194 | A1 | 10/2003 | Torigoe et al. | |
| 2009/0268234 | A1 * | 10/2009 | Furuya ........................ 358/1.15 |

FOREIGN PATENT DOCUMENTS

| JP | 2003-177886 | 6/2003 |
| KR | 2005-69049 | 7/2005 |

OTHER PUBLICATIONS

European Search Report issued Jan. 5, 2010 in EP Application No. 08159103.4.

* cited by examiner

*Primary Examiner* — Jerome Grant, II
(74) *Attorney, Agent, or Firm* — Stanzione & Kim, LLP

(57) ABSTRACT

In a color printing system the printer driver automatically obtains local characteristic information, such as countries, cities, languages, etc., stored in the OS of the host computer. The printer driver or the image forming apparatus color-converts the input data into output data, which reflects the color preference of the specific region where the image forming apparatus is installed, by using the look-up table corresponding to the local characteristic information obtained by the printer driver. Accordingly, the color preference of the specific region, in which the image forming apparatus is installed, is set more quickly and easily without requiring a complicated structure. The system includes a host computer to store local characteristic information of a region where an apparatus is installed, a printer driver to store look-up tables according to the local characteristic information, to select a look-up table corresponding to the local characteristic information obtained from the host computer, and to convert input data into output data representing a color corresponding to a color preference of a specific region by using the selected look-up table, and an image forming apparatus which is connected to the host computer so as to receive and print the output data, which is color-converted by the printer driver.

20 Claims, 12 Drawing Sheets

FIG. 6

| LOCAL CHARACTERISTIC INFORMATION ID | CONTINENT |
|---|---|
| LOCAL CHARACTERISTIC INFORMATION 1 | AMERICA |
| LOCAL CHARACTERISTIC INFORMATION 2 | EUROPE |
| LOCAL CHARACTERISTIC INFORMATION 3 | ASIA |
| . . . | . . . |
| LOCAL CHARACTERISTIC INFORMATION N | AFRICA |

FIG. 7

| LOCAL CHARACTERISTIC INFORMATION ID | CITY |
|---|---|
| LOCAL CHARACTERISTIC INFORMATION 1 | SEOUL |
| LOCAL CHARACTERISTIC INFORMATION 2 | TOKYO |
| LOCAL CHARACTERISTIC INFORMATION 3 | BEIJING |
| . . . | . . . |
| LOCAL CHARACTERISTIC INFORMATION N | LONDON |

FIG. 8

| LOCAL CHARACTERISTIC INFORMATION ID | LANGUAGE |
|---|---|
| LOCAL CHARACTERISTIC INFORMATION 1 | KOREAN |
| LOCAL CHARACTERISTIC INFORMATION 2 | JAPANESE |
| LOCAL CHARACTERISTIC INFORMATION 3 | CHINESE |
| ⋮ | ⋮ |
| LOCAL CHARACTERISTIC INFORMATION N | ENGLISH |

_(54)_ COLOR PRINTING SYSTEM

CROSS-REFERENCE TO RELATED APPLICATIONS

This application claims priority under 35 U.S.C. §119(a) from Korean Patent Application No. 2007-66338, filed in the Korean Intellectual Property Office on Jul. 3, 2007, the disclosure of which is incorporated herein by reference in its entirety.

BACKGROUND OF THE INVENTION

1. Field of the Invention

The present general inventive concept relates to a color printing system, and more particularly, to a color printing system capable of reproducing color according to a user preference and a region where a color printer is used.

2. Description of the Related Art

In general, a method employing a look-up table is widely used to reproduce a color copy similar to an original color in a color printer. The method of employing the look-up table is generally adopted in a printer or a scanner that experiences severe color distortion, and is capable of reliably expressing color variations over the entire color gamut. However, not only is it difficult to prepare the look-up table, but also the look-up table requires a large memory. Therefore, since a process for preparing the look-up table is very complicated and causes inconvenience because the color measurement is manually performed, a look-up table that is uniformly prepared by color printer manufacturers is employed in the conventional color printer.

Meanwhile, with the progress of color printing and the increase in international trade, color printers of the same brand are extensively used in various regions in the world.

However, there are colors that correspond with the preferences of inhabitants of particular regions or localities. The color preferences may reflect the emotion of inhabitants living in a specific region, so that the color preference corresponds to a color of cultural impact. For example, the Chinese like a red color, and Europeans are in favor of blue-based colors. In addition, since Asians and Westerners have different cultures and skin colors, they have a different color sense regarding flesh tones. Such a color preference may apply not only to the skin color, but also to the colors that people have seen continuously from one's childhood, such as colors in the sky, or vegetation in that region.

However, as the uniform look-up table is conventionally used according to the types of color printers, the color correction is uniformly performed without taking the color preference in each region into consideration.

In order to solve such problems, Korean Patent No. 601718 discloses a technology of reproducing colors according to the color preferences of users in each country by confirming the current location of a color printer by using a GPS (global positioning system), downloading a color conversion look-up table corresponding to each country code from a server based on each country code, and converting the color of a document by using the downloaded look-up table.

However, since the above-mentioned approach requires the GPS to confirm the location of the color printer and download the color conversion look-up table corresponding to each country code from the server after recognizing each country code, the above-mentioned approach has a complicated structure while being expensive and slow.

SUMMARY OF THE INVENTION

The present general inventive concept provides a color printing system, capable of effectively reproducing colors according to the color preferences a user color preference and a region where an image forming apparatus is installed.

In addition, the present general inventive concept provides a color printing system, capable of quickly and easily determining the color preferences of persons living in a region where an image forming apparatus is installed.

Additional aspects and/or utilities of the general inventive concept will be set forth in part in the description which follows and, in part, will be apparent from the description, or may be learned by practice of the general inventive concept.

The foregoing and/or other aspects and utilities of the present general inventive concept may be achieved by providing a color printing system including a host computer to store local characteristic information of a region where an apparatus is installed, a printer driver to store look-up tables according to the local characteristic information, to select a look-up table corresponding to the local characteristic information obtained from the host computer, and to convert input data into output data representing a color corresponding to a color preference of a specific region by using the selected look-up table, and an image forming apparatus which is connected to the host computer so as to receive and print the output data, which is color-converted by the printer driver.

The foregoing and/or other aspects and utilities of the present general inventive concept may also be achieved by providing a color printing system including a host computer to store local characteristic information of a region where an apparatus is installed, a printer driver to obtain automatically the local characteristic information from the host computer, and an image forming apparatus, which is connected to the host computer, to store look-up tables according to the local characteristic information, to receive the local characteristic information obtained from the printer driver to select a look-up table corresponding to the received local characteristic information, to convert input data into output data representing a color corresponding to a color preference of a specific region by using the selected look-up table, and to print the output data.

The foregoing and/or other aspects and utilities of the present general inventive concept may also be achieved by providing a method of operating a color printing system, the method including storing local characteristic information corresponding to a geographic location where the system operates, storing look-up tables including a look-up table corresponding to the local characteristic information, retrieving the stored local characteristic information after initiation of a printing sequence, selecting the look-up table corresponding to the local characteristic information, converting input data into output data by using the selected look-up table, the output data including a color associated with the geographic location where the system operates and printing the color.

The foregoing and/or other aspects and utilities of the present general inventive concept may also be achieved by providing a local network including a server to store local characteristic information corresponding to a geographical location where the server operates, a plurality of terminals connected in a communication channel with the server, each terminal including a printer driver to obtain automatically from the server the local characteristic information and an image forming apparatus in the communication channel with the server and terminals, to store look-up tables including a look-up table corresponding to the local characteristic information, the apparatus capable of receiving the local characteristic information when transmitted from the printer driver of any terminal, in order to select a look-up table corresponding to the received local characteristic information, to convert input data into output data appropriately corresponding to the geographical location of the server, by using the selected look-up table, and printing the output data.

The output data corresponding to the geographical location of the server may include at least one color.

The foregoing and/or other aspects and utilities of the present general inventive concept may also be achieved by providing a color printing system including a memory to store local characteristic information and a control unit to select one of the local characteristic information, and to convert input data to output data to represent a color corresponding to the selected one of the local characteristic information such that the output data is printed on a printing medium.

The color printing system may include input data in an RGB format.

The color printing system may include output data in an YMCK format.

The color printing system may provide the control unit as a printer driver.

The color printing system may allow the printer driver to receive the local characteristic information from an operating system of a host computer upon request when the printer driver receives a printing command relative to the input data, thereby automatically obtaining the local characteristic information.

The color printing system may allow the control unit to change the selected look-up table to a different look-up table according to a request by a user.

The color printing system may allow the local characteristic information to include at least one of continent information, country information, city information and language information of a region where the control unit is installed.

BRIEF DESCRIPTION OF THE DRAWINGS

These and/or other aspects and utilities of the general inventive concept will become apparent and more readily appreciated from the following description of the embodiments, taken in conjunction with the accompanying drawings of which:

FIG. 6 is a view illustrating a case in which local characteristic information is continent information according to another embodiment of the present general inventive concept;

FIG. 7 is a view illustrating a case in which local characteristic information is city information according to another embodiment of the present general inventive concept;

FIG. 8 is a view illustrating a case in which local characteristic information is language information according to another embodiment of the present general inventive concept;

DETAILED DESCRIPTION OF THE PREFERRED EMBODIMENTS

Figure 1:
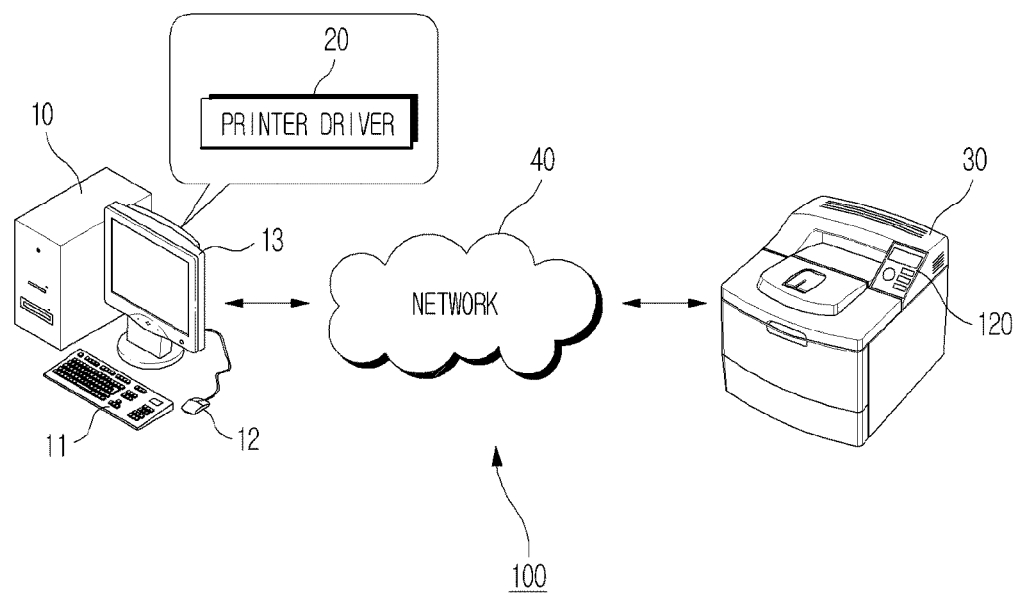
FIG. 1 is a view of a color printing system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

As illustrated in FIG. 1, a color printing system 100 according to an embodiment of the present general inventive concept includes a host computer 10, an image forming apparatus 30, such as an inkjet printer, a laser printer, a multifunctional peripheral, etc., which is connected to the host computer 10 through a network 40, and a printer driver 20 installed in the host computer 10 to control a printing function of the image forming apparatus 30.

The host computer 10 includes an input device, a display device, a ROM (random only memory), a RAM (random access memory) and an interface device. The input device is a user interface. The input device includes a keyboard 11, a mouse 12, etc., so that a user may input various functions supported by the host computer 10. The user inputs various commands required for operating the system 100 by controlling the keyboard 11, the mouse 12, etc. The display device includes a CRT 13 (cathode ray tube) and may also include an LCD (liquid crystal display, not shown), and the user may confirm information on various programs executed by the host computer 10 in letters and graphics by referring to a UI (user interface) window. With such a display device, the user can confirm execution and result of the program by referring to the UI window displayed on a display section 120. The ROM is a non-volatile memory, and it retains information stored therein even when power of the host computer 10 is interrupted. Such a ROM stores a control program and various application programs, such as an OS (operating system), which are required for realizing functions of the host computer 10. The RAM is a volatile memory, and it stores various data generated during the execution of the program.

Figure 2:
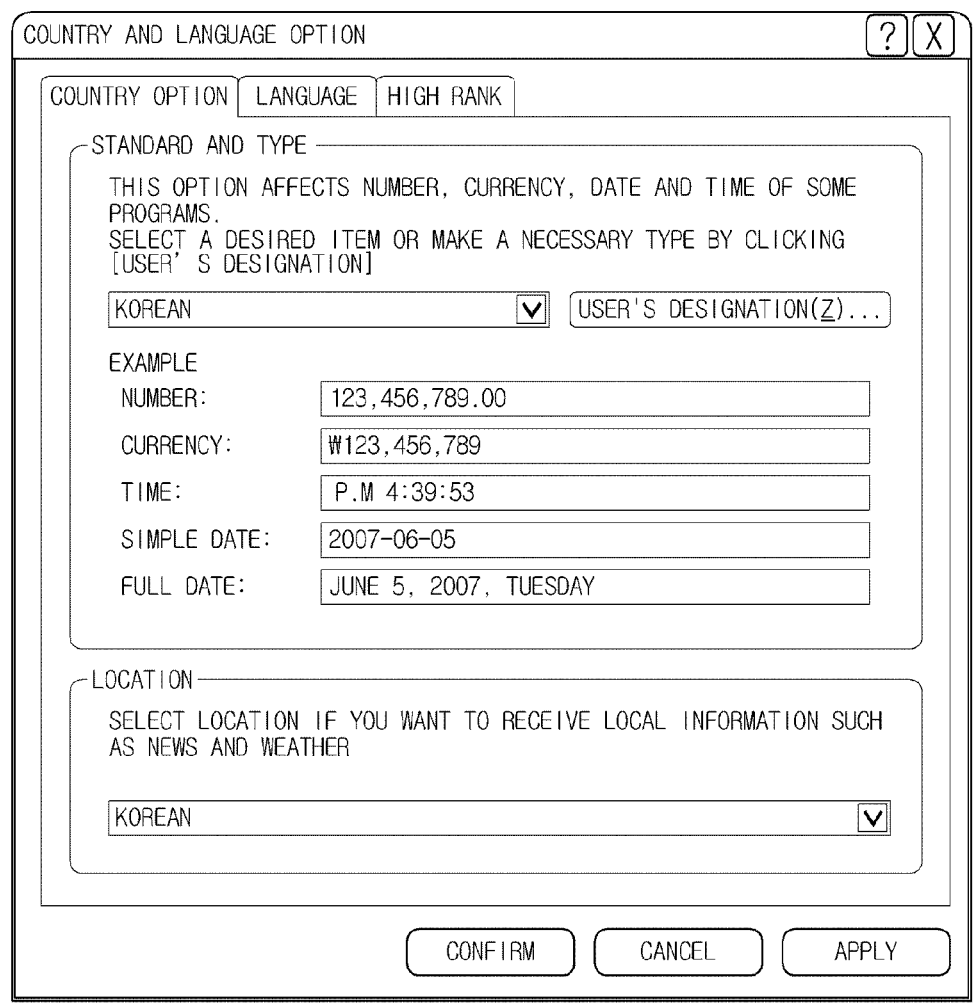
FIG. 2 is a view illustrating country information and language information which are examples of local characteristic information stored in an operating system of the host computer illustrated in FIG. 1.
Figure 3:
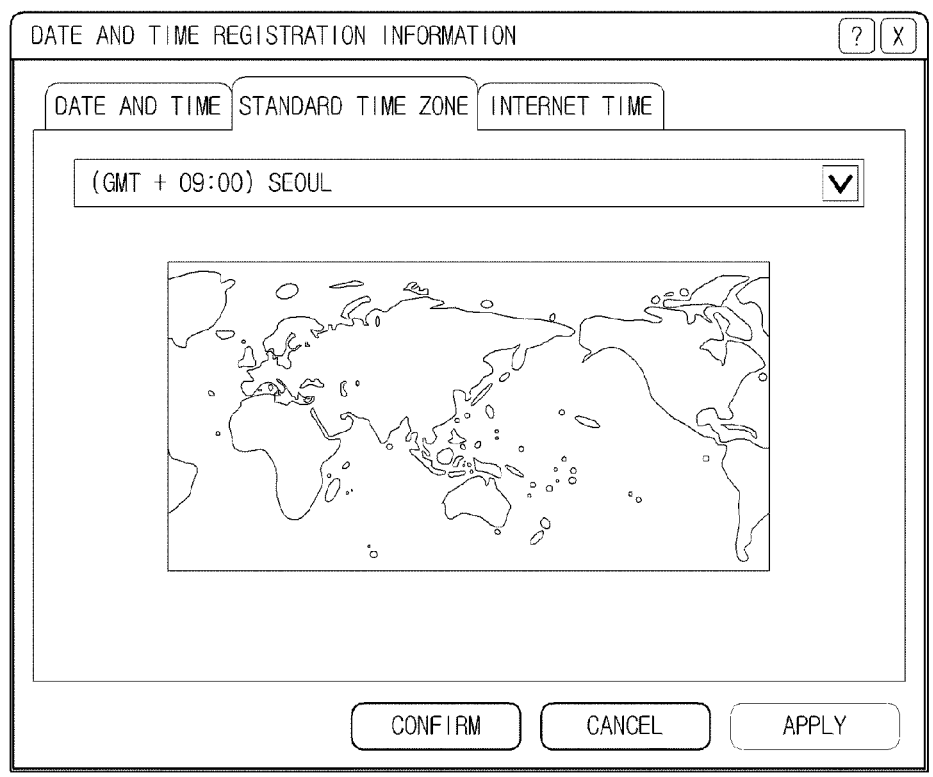
FIG. 3 is a view illustrating city information which is an example of local characteristic information stored in the system illustrated in FIG. 1.

As illustrated in FIGS. 2 and 3, the host computer 10 having the above components is provided with an OS such as Microsoft WINDOWS® , LINUX, etc. Local characteristic information is stored in the OS. The local characteristic information includes country information such as Korea, Japan, China, etc., city information such as Seoul, Tokyo, Beijing, etc., and language information such as Korean, Japanese, Chinese, etc. Such local characteristic information is basically set in the OS when the OS is installed in the host computer 10.

Hereinafter, the printer will be described as an example of the image forming apparatus 30 by assigning the same reference numeral 30 for the sake of convenience.

The printer driver 20 or the printer 30 is provided with a plurality of look-up tables (LUT) used for color-converting predetermined RGB (red, green and blue) data into YMCK (yellow, magenta, cyan and black) data. The look-up tables color-convert the random RGB data into the YMCK data representing a color corresponding to color preference of a person living in a specific region. The look-up tables correspond to the local characteristic information.

The printer driver 20 receives data from the application program installed in the host computer 10 and then outputs print data to the printer 30, which is capable of interpreting the output print data.

When the look-up tables are stored in the printer driver 20 according to the local characteristic information, if the printer driver 20 is installed in the host computer 10 or if the printer driver 20 receives a printing command from the host computer 10, the printer driver 20 automatically obtains the local characteristic information stored in the host computer 10. Then, after color-converting RGB print data into YMCK print data representing the color corresponding to the color preference of the specific region by using the look-up tables corresponding to the obtained local characteristic information, the printer driver 20 transmits the YMCK print data to the printer 30.

Figure 4:
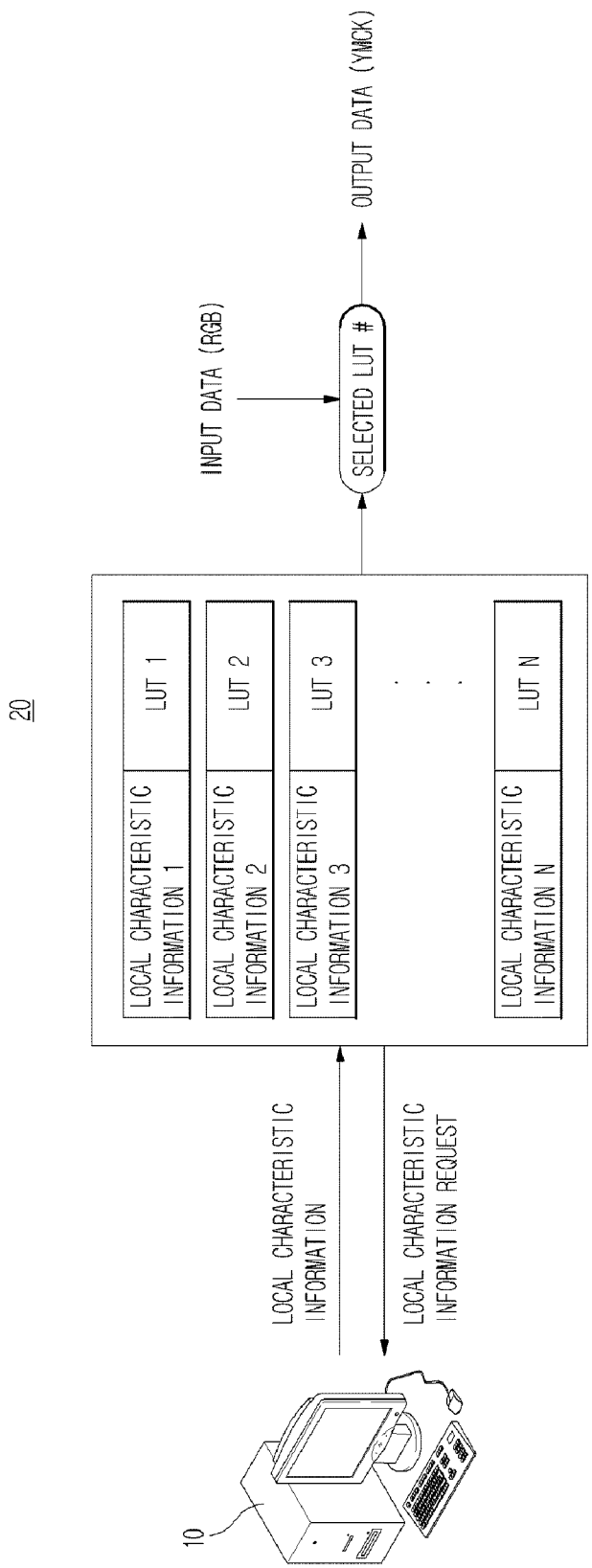
FIG. 4 is a view illustrating an operation of a printer driver when a plurality of look-up tables are stored in the printer driver according to an embodiment of the present general inventive concept.

As illustrated in FIG. 4, the look-up tables corresponding to the local characteristic information are stored in the printer driver 20. If the printer driver 20 is installed in the host computer 10 or if the printer driver 20 receives the printing command from the host computer 10, the printer driver 20 requests the local characteristic information from the host computer 10. Upon receiving the request, the host computer 10 transmits the local characteristic information stored in the OS to the printer driver 20. Accordingly, the printer driver 20 automatically obtains the local characteristic information of a region where the host computer 10 is installed. Then, the printer driver 20 selects a look-up table corresponding to the obtained local characteristic information from the plural look-up tables by using the obtained local characteristic information, and then sets the selected look-up table as a basic look-up table. After color-converting RGB type input data into YMCK type output data by using the selected look-up table, the printer driver 20 transmits the YMCK print data to the printer 30.

Meanwhile, when the look-up tables are stored in the printer driver 20 according to the local characteristic information, if the printer driver 20 is installed in the host computer 10 or if the printer driver 20 receives a printing command from the host computer 10, the printer driver 20 automatically obtains the local characteristic information stored in the host computer 10 and transmits the obtained local characteristic information to the printer 30. After converting RGB print data into YMCK print data representing the color corresponding to the color preference of the specific region by using the look-up tables corresponding to the local characteristic information obtained by the printer driver 20, the printer 30 performs a printing process.

It is possible that the host computer 10 includes a memory to store the look-up tables.

Figure 5:
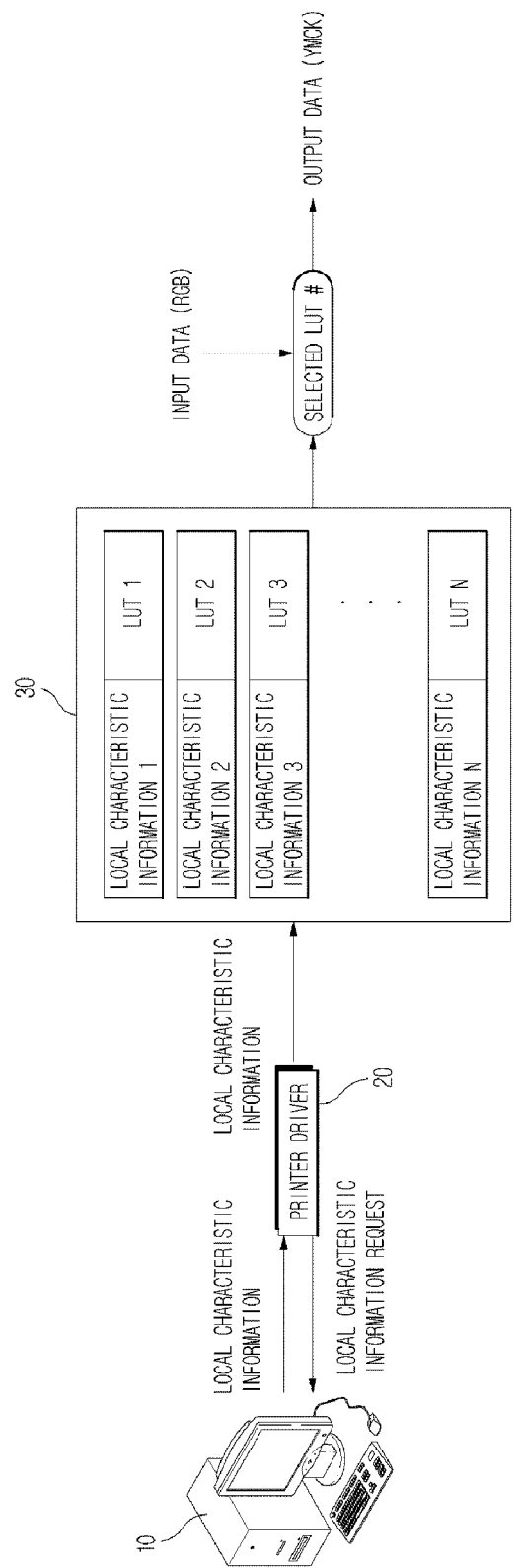
FIG. 5 is a view illustrating an operation of a printer when a plurality of look-up tables are stored in the printer according to another embodiment of the present general inventive concept.

As illustrated in FIG. 5, the look-up tables corresponding to the local characteristic information are stored in the printer 30. If the printer driver 20 is installed in the host computer 10 or if the printer driver 20 receives the printing command from the host computer 10, the printer driver 20 requests the local characteristic information to the host computer 10. Upon receiving the request, the host computer 10 transmits the local characteristic information stored in the OS to the printer driver 20. Accordingly, the printer driver 20 automatically obtains the local characteristic information of a region where the host computer 10 is installed. Then, the printer driver 20 transmits the obtained local characteristic information to the printer 30. The printer 30 receives the local characteristic information obtained by the printer driver 20 to select a look-up table corresponding to the obtained local characteristic information from the plural look-up tables, and then sets the selected look-up table as a basic look-up table for the color conversion. After that, the printer 30 converts RGB type input data into YMCK type output data suitable for the color tone preference of the specific region by using the selected look-up table, and then performs a printing process.

As illustrated in FIGS. 6 through 8, the local characteristic information may include any geographic location information, e.g. continent information such as North America, Europe, Asia, etc., or city information such as Seoul, Tokyo, Beijing, etc., or language information such as Korean, Japanese, Chinese, etc. In addition, the local characteristic information may include country information such as Korea, Japan, China, etc. Moreover, the local characteristic information may include a combination of the above-mentioned information.

Figure 9:
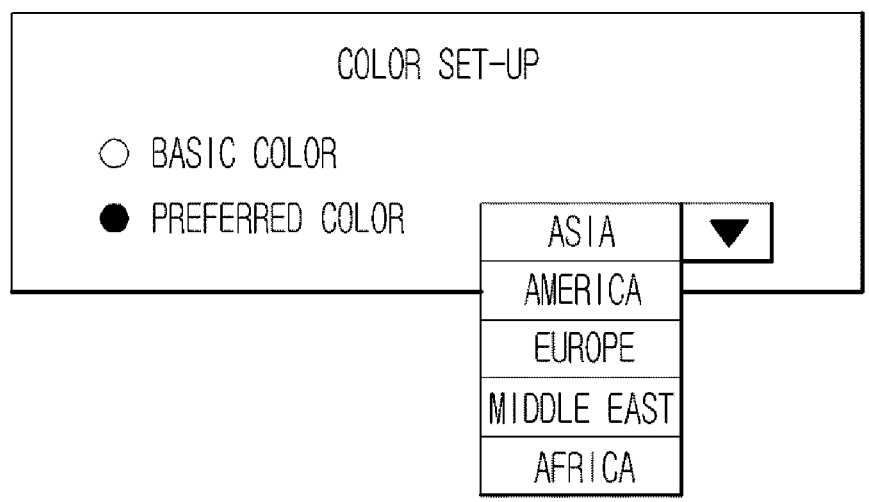
FIG. 9 is a view illustrating a change in a look-up table corresponding to selected local characteristic information according to another embodiment of the present general inventive concept.
Figure 10:
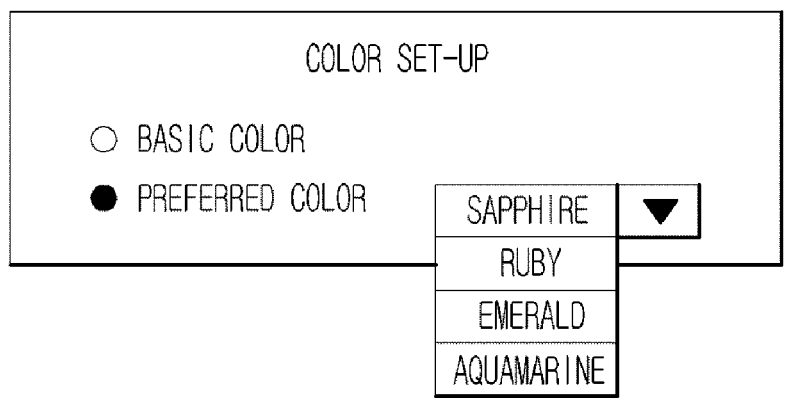
FIG. 10 is a view illustrating another example of FIG. 9.

As illustrated in FIG. 9, even if the look-up table is set from the plural look-up tables, the user can click the color preference item from a color set-up window used for allowing the user to change the color preference, and then the user can select one set of the desired local characteristic information, such as "Asia", "America", "Europe", "Middle East", "Africa", etc., or "sapphire", "ruby", "emerald", "aquamarine", etc., as illustrated in FIGS. 9 and 10, so that the user can change the color preference by replacing the preset look-up table with a different look-up table.

Figure 12:
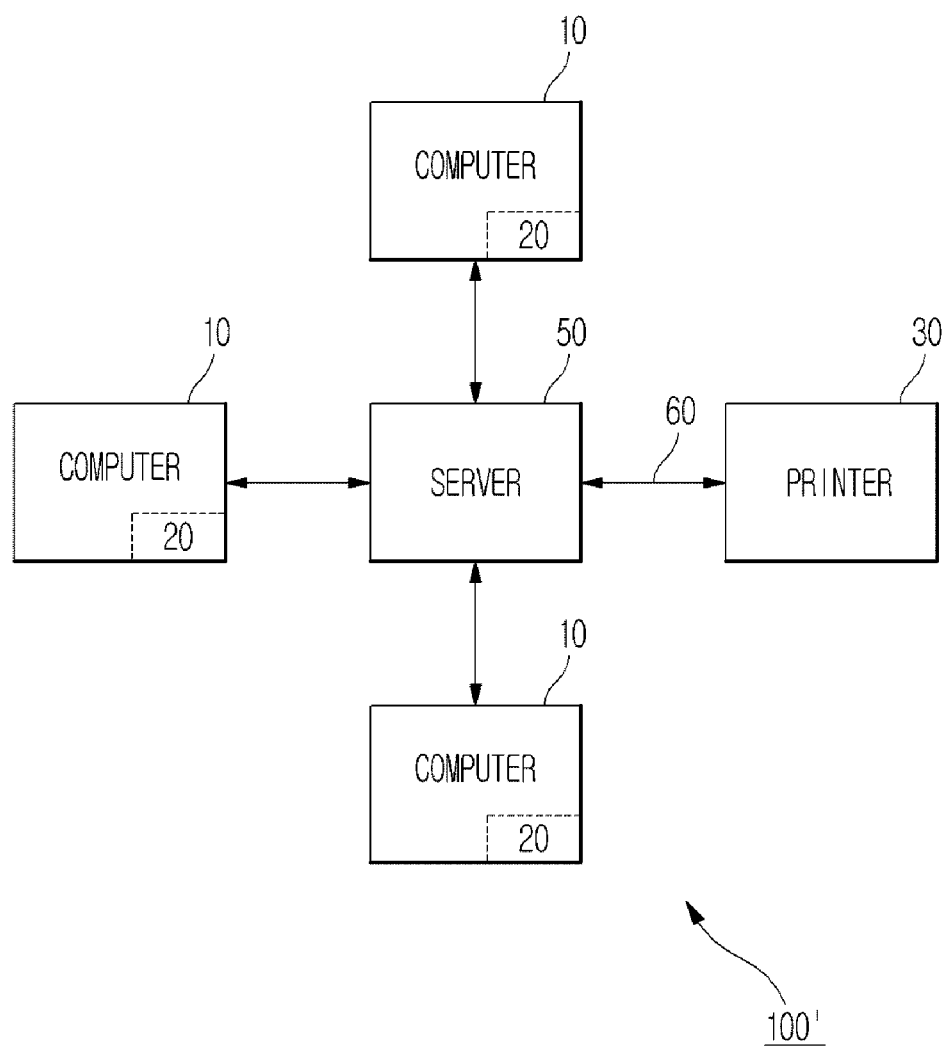
FIG. 12 is a block diagram illustrating a color printing system according to another embodiment of the present general inventive concept.

As illustrated in FIG. 12, a color printing system 100' includes a server 50 in a communication channel 60 with printer 30 and a plurality of computers or terminals 10. Each computer 10 is connected in a communication channel 60. The local characteristic information corresponds to the geographical location where the server 50 operates. The plurality of terminals 10 are connected in the communication channel 60 with the server 50. Each terminal includes a printer driver 20 to obtain automatically from the server 50 the local characteristic information. A printer 30 in the communication channel 60 with the server 50 and terminals 10, stores look-up tables including a look-up table corresponding to the local characteristic information. The printer 30 is capable of receiving the local characteristic information when transmitted from the printer driver 20 of any terminal 10 in a printing sequence after the print command has been given. After receiving the local characteristic information, the printer 30 selects a look-up table corresponding to the received local characteristic information, to convert input data into output data appropriately corresponding to the geographical location of the server 50, by using the selected look-up table, and printing the output data.

Figure 11:
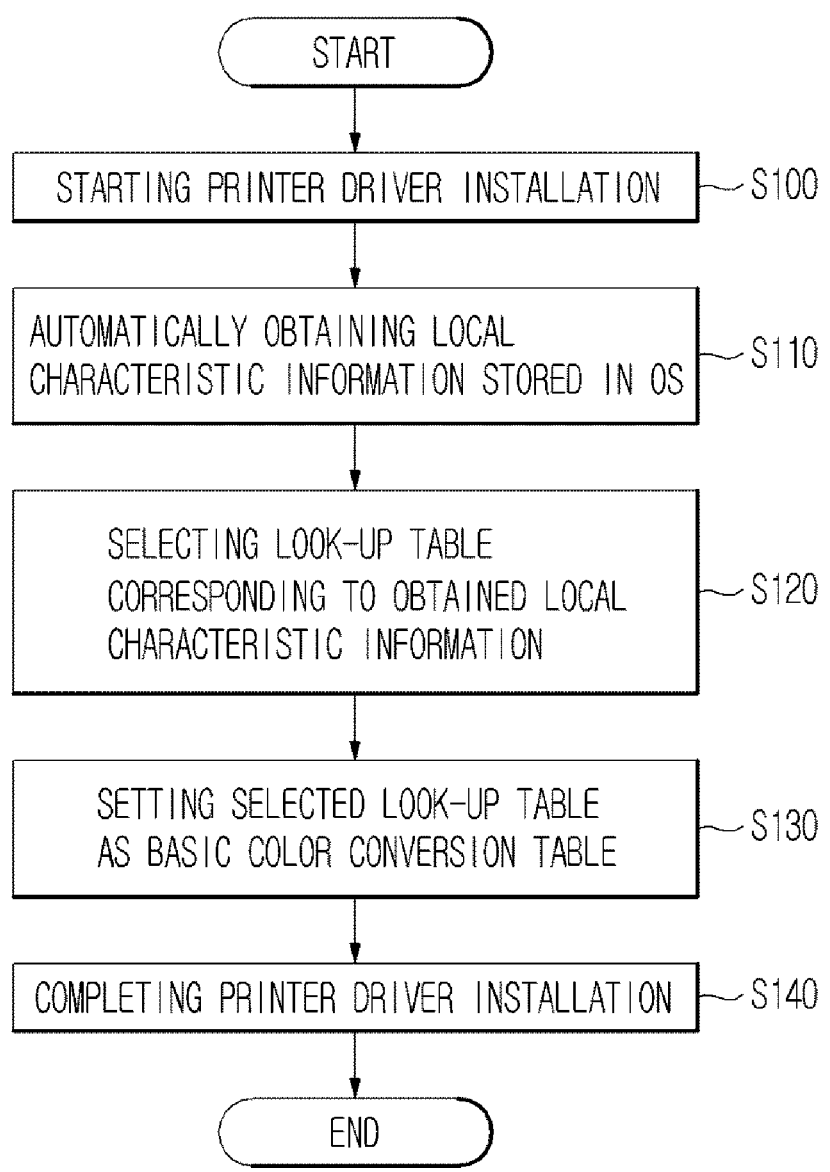
FIG. 11 is a flowchart illustrating a procedure of setting a look-up table corresponding to local characteristic information of a region where a host computer is installed according to the embodiment of FIG. 4.

As illustrated in FIG. 11, the color printing system according to an embodiment of the present general inventive concept is capable of setting a look-up table, which reflects the color preferences corresponding to a region where the printer 30 is installed, through installation of the printer driver 20 in the host computer 10 (S100), allowing the printer driver 20 to automatically obtain the local characteristic information stored in the OS of the host computer 10 when the printer driver 20 is installed in the host computer 10 (S110), allowing the printer driver 20 or the printer 30 to select a look-up table corresponding to the local characteristic information obtained by the printer driver 20 (S120), allowing the printer driver 20 or the printer 30 to set the selected look-up table as a basic look-up table for the color conversion (S130), and completing the installation of the printer driver 20 in the host computer 10 (S140). After that, the RGB print data is color-converted into the YMCK print data representing the color corresponding to the color preferences of the specific region according to the print command by using the look-up table, and then the printer 30 performs the printing process.

According to the present general inventive concept, the image forming apparatus 30 may include a memory to store the above-described look-up tables. The UI may be displayed on a screen of a key pad 120, and the local characteristic information can be selected using a key of the key pad 120. In this case, the host computer 10 may not have the look-up tables, and the image forming apparatus 30 may receive print data, to which the local characteristic information is not applied, and a converting process to convert the print data according to the input local characteristic information such that a user color preference and/or the local characteristic information are used to change or adjust the print data.

The present general inventive concept can be realized as a method, an apparatus, and a system. When the present general inventive concept is manifested in computer software, components of the present general inventive concept may be replaced with code segments that are necessary to perform the required action. Programs or code segments may be stored in media readable by a processor, and transmitted as computer data that is combined with carrier waves via a transmission media or a communication network.

The media readable by a processor include anything that can store and transmit information, such as, electronic circuits, semiconductor memory devices, ROM, flash memory, EEPROM, floppy discs, optical discs, hard discs, optical fiber, radio frequency (RF) networks, etc. The computer data also includes any data that can be transmitted via an electric network channel, optical fiber, air, electromagnetic field, RF network, etc.

As described above, according to the present general inventive concept, the printer driver automatically obtains the local characteristic information, such as countries, cities, languages, etc., stored in the OS of the host computer as basic information. The printer driver or the image forming apparatus color-converts the input data into the output data, which reflects the color preference of the specific region where the image forming apparatus is installed, by using the look-up table corresponding to the local characteristic information obtained by the printer driver. Accordingly, the color preference of the specific region, in which the image forming apparatus is installed, is set more quickly and easily without requiring a complicated structure.

Although few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A color printing system comprising:
a host computer having a memory to store local characteristic information of a region where an apparatus is installed;
a printer driver to store look-up tables according to the local characteristic information, to select a look-up table corresponding to the local characteristic information obtained from the host computer, and to convert input data into output data representing a color corresponding to a color preference of a specific region by using the selected look-up table; and
an image forming apparatus which is connected to the host computer so as to receive and print the output data, which is color-converted by the printer driver.

2. The color printing system of claim 1, wherein the printer driver receives the local characteristic information from an operating system of the host computer upon request when the printer driver is installed in the host computer, thereby automatically obtaining the local characteristic information.

3. The color printing system of claim 1, wherein the printer driver receives the local characteristic information from an operating system of the host computer upon request when the printer driver receives a printing command relative to the input data, thereby automatically obtaining the local characteristic information.

4. The color printing system of claim 1, wherein the local characteristic information includes at least one of continent information, country information, city information and language information of a region where the host computer is installed.

5. The color printing system of claim 1, wherein the printer driver changes the selected look-up table to a different look-up table according to a request by a user.

6. A color printing system comprising:
a host computer to store local characteristic information of a region where an apparatus is installed;
a printer driver to obtain automatically the local characteristic information from the host computer; and
an image forming apparatus, which is connected to the host computer, to store look-up tables according to the local characteristic information, to receive the local characteristic information obtained from the printer driver to select a look-up table corresponding to the received local characteristic information, to convert input data into output data representing a color corresponding to a color preference of a specific region by using the selected look-up table, and prints the output data.

7. The color printing system of claim 6, wherein the printer driver receives the local characteristic information from an operating system of the host computer upon request when the printer driver is installed in the host computer, thereby automatically obtaining the local characteristic information.

8. The color printing system of claim 6, wherein the printer driver receives the local characteristic information from an operating system of the host computer upon request when the printer driver receives a printing command relative to the input data, thereby automatically obtaining the local characteristic information.

9. The color printing system of claim 6, wherein the local characteristic information includes at least one of continent information, country information, city information and language information of a region where the host computer is installed.

10. The color printing system of claim 6, wherein the image forming apparatus changes the selected look-up table to a different look-up table according to a request by a user.

11. A method of operating a color printing system, the method comprising:
storing local characteristic information corresponding to a geographic location where the system operates;
storing look-up tables including a look-up table corresponding to the local characteristic information;
obtaining the stored local characteristic information after initiation of a printing sequence;
selecting the look-up table corresponding to the local characteristic information;

converting input data into output data by using the selected look-up table, the output data including a color associated with the geographic location where the system operates; and printing the color.

12. A local network comprising:

a server to store local characteristic information corresponding to a geographical location where the server operates;

a plurality of terminals connected in a communication channel with the server, each terminal including a printer driver to obtain automatically from the server the local characteristic information; and an image forming apparatus in the communication channel with the server and terminals, to store look-up tables including a look-up table corresponding to the local characteristic information, the apparatus capable of receiving the local characteristic information when transmitted from the printer driver of any terminal, in order to select a look-up table corresponding to the received local characteristic information, to convert input data into output data appropriately corresponding to the geographical location of the server, by using the selected look-up table, and printing the output data.

13. The network of claim 12, wherein the output data appropriately corresponding to the geographical location of the server, includes at least one color.

14. A color printing system comprising:

a memory to store local characteristic information; and a control unit to select one of the local characteristic information, and to convert input data to output data to represent a color corresponding to the selected one of the local characteristic information such that the output data is printed on a printing medium.

15. The color printing system of claim 14, wherein the input data is in an RGB format.

16. The color printing system of claim 14, wherein the output data is in an YMCK format.

17. The color printing system of claim 14, wherein the control unit is a printer driver.

18. The color printing system of claim 17, wherein the printer driver receives the local characteristic information from an operating system of a host computer upon request when the printer driver receives a printing command relative to the input data, thereby automatically obtaining the local characteristic information.

19. The color printing system of claim 14, wherein the control unit changes the selected look-up table to a different look-up table according to a request by a user.

20. The color printing system of claim 14, wherein the local characteristic information includes at least one of continent information, country information, city information and language information of a region where the control unit is installed.

* * * * *